July 4, 1950 A. V. BEDFORD 2,514,117

NOISE LIMITING VIDEO CIRCUIT

Filed April 1, 1946 2 Sheets-Sheet 1

INVENTOR
Alda V. Bedford
BY H. S. Grover.
ATTORNEY

July 4, 1950 A. V. BEDFORD 2,514,117

NOISE LIMITING VIDEO CIRCUIT

Filed April 1, 1946 2 Sheets-Sheet 2

INVENTOR
Alda V. Bedford
BY H. S. Grover
ATTORNEY

Patented July 4, 1950

2,514,117

UNITED STATES PATENT OFFICE 2,514,117

NOISE LIMITING VIDEO CIRCUIT

Alda V. Bedford, Princeton, N. J., assignor to Radio Corporation of America, a corporation of Delaware Application April 1, 1946, Serial No. 658,601

15 Claims. (Cl. 178—44)

The present invention relates to television systems, and more particularly relates to means for reducing the effect of spurious high-frequency components, such as noise, which may be present in the video signal circuit of such systems.

In applicant's concurrently filed copending application, entitled "Video Signal Circuit for Noise Limiting," Serial No. 658,600, filed April 1, 1946, there is disclosed a method and means for reducing the amplitude of the high-frequency components in the video signal regions corresponding only to dark gray and black. This does not adversely affect resolution in the lighter image areas, as would a broad attenuation of such undesired high-frequency components between the amplitude limits of the video signal. Furthermore, since such an expedient causes the dark gray and black areas of the reproduced image to appear darker to an observer, it follows that the contrast, or tone value, of the image is improved.

The present disclosure constitutes a further development of the invention set forth in the above-mentioned copending application, and one object thereof is to provide means whereby attenuation of the undesired high-frequency components may be made more severe for "near black" signal regions than for those corresponding to less dark gray.

Another object of the present invention is to provide means for preventing spurious high-frequency components occurring in nominally dark areas and having very large amplitude from extending far enough into the white signal region to escape the attenuating action of the system.

A still further object of the present invention is to correlate the degree of attenuation of the high-frequency components with the strength of the received signal, so that reception of a strong R. F. signal, which is generally free from noise, results in relatively little reduction in the amplitude of the high-frequency signal components. Conversely, reception of a weaker R. F. signal causes any spurious high-frequency components which may be present in dark areas to be attenuated to a greater degree.

Other objects and advantages will be apparent from the following description of preferred forms of the invention and from the drawings, in which.

Figures 1, 2:
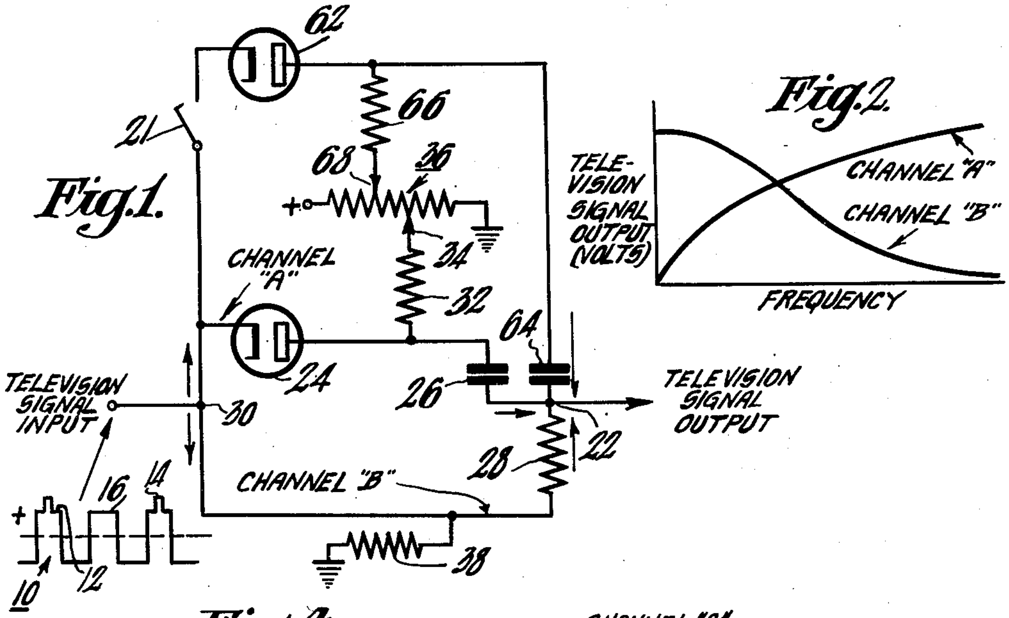
Fig. 1 is a circuit diagram of a preferred embodiment of the present invention.
Fig. 2 is a graph of output vs. frequency for the two channels of Fig. 1.

Referring now to Fig. 1, there is shown a portion of a television system in accordance with the present invention. The input to the illustrated circuit comprises a composite television video signal, the waveform of which may, for example, be such as generally indicated by the reference numeral 10. A television signal of this nature may be obtained through the use of components now known in the art.

Figure 3:
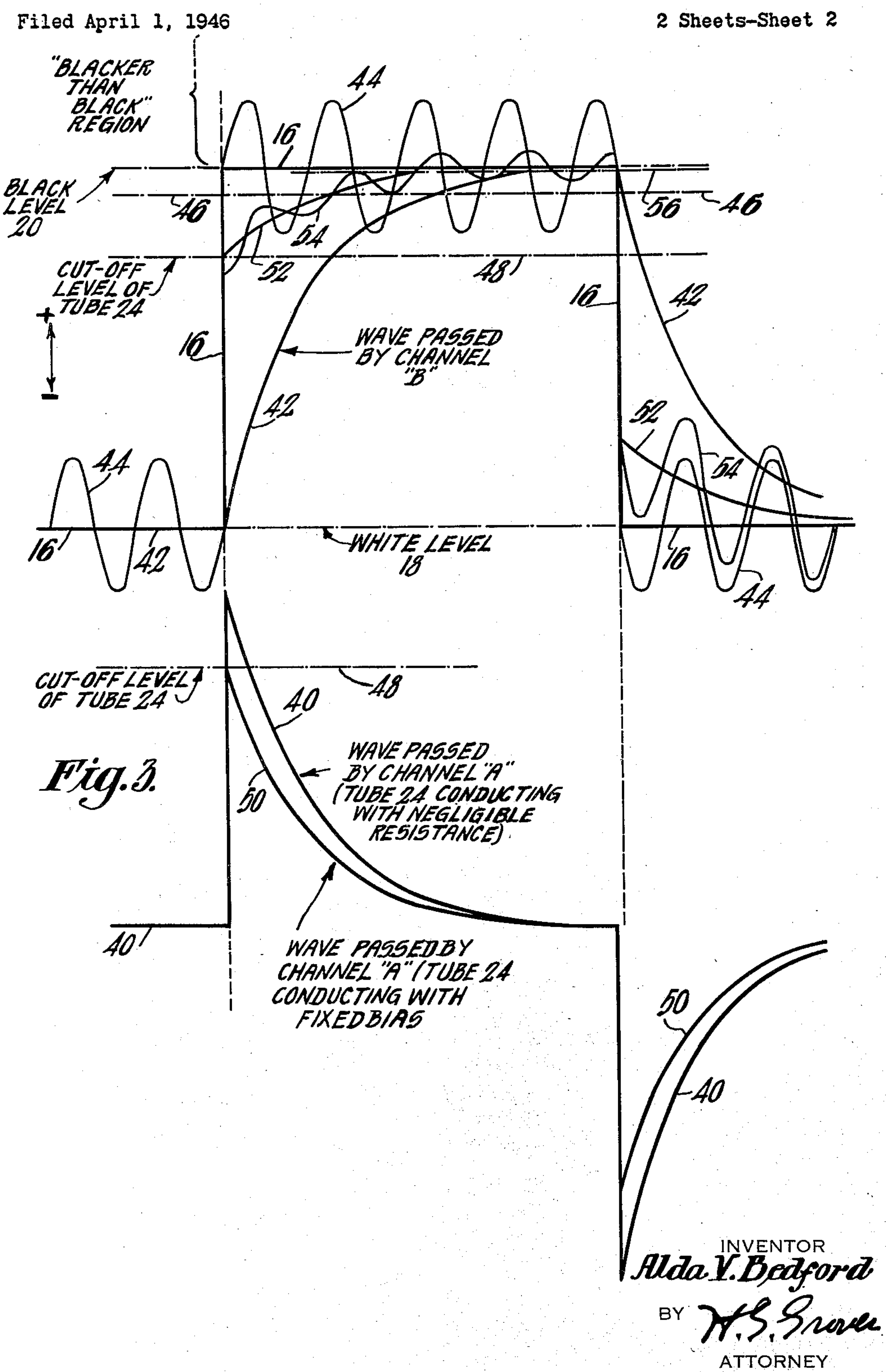
Fig. 3 is a set of waveforms useful in explaining the operation of the circuit of Fig. 1.

Each cycle of the signal wave 10 includes a blanking pedestal 12, a line synchronizing pulse 14, and a video signal component 16. This video signal component 16, also illustrated in Fig. 3, is chosen for the purpose of describing the present invention to be of substantially rectangular configuration, and extends from white level (indicated by the broken line 18 in Fig. 3) to black level (indicated in Fig. 3 by the broken line 20). It therefore corresponds in the reproduced image to a black area on a white background.

While the complete circuit of Fig. 1 is generally employed in carrying out one form of the present invention, a section of this circuit may be rendered ineffective by the opening of switch 21. When the switch 21 is thus opened, the portion of the circuit of Fig. 1 which remains capable of operation is substantially identical to one inventive embodiment illustrated and described in applicant's copending case referred to above. Since an understanding of the operation of this embodiment of applicant's hereinbefore mentioned application, Serial No. 658,600, is essential to an understanding of the operation of the present invention, a detailed description of the former will now be given.

The circuit of Fig. 1 is so designed that, when switch 21 is open, high-frequency components of the input wave 10 reach the output terminal 22 by means of channel A, which includes an electron discharge tube 24 and a capacitor 26. The low-frequency components of the input wave 10 reach the output terminal 22 by means of channel B, which includes a resistor 28.

Tube 24, which has been illustrated as a diode but which, if desired, may be of any other suitable type, has its cathode connected to the input terminal 30 and its anode connected to one plate of capacitor 26. A positive potential (from a source not shown) is applied to the anode of tube 24 through a resistor 32 one terminal of which is connected to the anode of tube 24 and the other terminal of which is connected to an adjustable tap 34 on a potentiometer 36. The ends of the resistor element of potentiometer 36 are connected respectively to ground and to a source of positive potential, so that by adjusting the position of tap 34, the voltage applied to the anode of tube 24 may be varied.

A further resistor 38 has one end connected to ground and its other end joined to input terminal 30. This resistor completes the direct current path through tube 24.

When tube 24 is conducting with negligible resistance, the two channels A and B have substantially the frequency-response characteristics shown in Fig. 2. For the purpose of the present invention, these characteristics may be assumed to be complementary in an additive sense. Therefore, when tube 24 is conducting with negligible resistance, a wave such as 40 (Fig. 3) will be passed by channel A. Similarly, a wave such as 42 will be passed by channel B. In this connection, bias resistor 32 in Fig. 1 is chosen to be of relatively low value, and the wave 42 represents the voltage which would appear at the output terminal 22 if tube 24 were rendered non-conductive so that the upper plate (in the drawing) of capacitor 26 assumed A.-C. ground potential due to the low value of resistor 32. Since channels A and B are complementary, the sum of waves 40 and 42 is substantially equal to the video input wave 16.

Assume now that a spurious high-frequency component, such as noise, is added to the composite video input wave 16. This spurious component is illustratively represented in Fig. 3 by the sine wave 44. Since this noise component 44 has equal swings in the black and white directions, the average brightness of the white area of the image will not be changed by the noise. In the black area of the image, the upward swings of the noise wave 44 extend into the "blacker-than-black" region and have no effect, since they are beyond the cut-off of the kinescope. The downward swings due to the noise, however, have the effect of increasing the brightness of the image, and the average brightness in the black area is shifted downward from the level 20 to a new false level which is indicated in Fig. 3 by the broken line 46.

Such an increase in the average brightness for the nominally black areas from level 20 to a new position 46 impairs the contrast of the reproduced image. This effect is largely overcome by reducing the amplitude of the spurious high frequency, or noise, components in the dark gray and black areas only. It will be appreciated that if the high-frequency components were broadly attenuated for all image areas, the result would be an impairment of resolution in the lighter regions.

Referring again to the tube 24 of Fig. 1, it has been stated that the value of its anode potential is dependent upon the position of potentiometer tap 34. This tap 34 may be so adjusted that conduction of diode 24 is cut off at a level 48 (Fig. 3) which lies in the dark gray signal region between the white level 18 and the black level 20. The effect of tube 24 when thus adjusted is to alter the form of the wave normally passed by channel A (which includes tube 24) from that shown by the reference numeral 40 in Fig. 3 to that indicated by the reference numeral 50. Inasmuch as channel B is unaffected by a change in the bias on tube 24, wave 42 will continue to be passed thereby, and the output wave at point 22 will be a combination of waves 42 and 50, or, in other words, wave 52.

Now, if the high-frequency noise component 44 is assumed to be added to the input wave 16, the output becomes wave 54. While it might be expected that the noise component 44 would be completely attenuated above the cut-off level 48, nevertheless this wave 44 actually has a residual amplitude which is due to the high-frequency response of channel B alone.

The average brightness of the image in the black region under the conditions just described is represented by the horizontal broken line 56. This horizontal line 56 is much closer to the true black level 20 than is the horizontal line 46 which represents the average brightness of the nominally black area when the tube 24 of Fig. 1 operates without bias. Hence, an improvement in the contrast of the reproduced image is brought about.

It will be noted that in all cases where the input signal remains below the cut-off level 48, (or, in other words, on the white side thereof) the output wave is substantially identical to the input wave.

In accordance with one embodiment of the present invention, a second, or supplementary, path is provided for the high-frequency components of the input wave 10. This path, as shown in Fig. 1, is introduced by the closing of switch 21, so that the said high-frequency components reach the output terminal 22 not only by way of tube 24 and capacitor 26 (channel A), but also by way of a further tube 62 and a further capacitor 64.

As will be seen from the drawing, the series combination of tube 62 and capacitor 64 is effectively in parallel relation with the series combination of tube 24 and capacitor 26. The cathode of tube 62, which may be a diode or a tube of any other suitable type, is connected to switch 21, while the anode of tube 62 is connected to one plate of capacitor 64. A positive potential is applied to the anode of tube 62 through a resistor 66 one terminal of which is joined to the anode of tube 62, and the other terminal of which is connected to a second adjustable tap 68 on potentiometer 36.

It has been stated that tap 34 may be so adjusted that diode 24 cuts off at level 48 (Fig. 3). If tap 68 is now adjusted so that diode 62 has a higher positive potential applied to the anode thereof than has diode 24, then the former will cease conducting at a higher positive value of the video input wave 16. In other words, the cut-off level of diode 62 may be chosen to lie between the cut-off level 48 of tube 24 and the black level 20.

The effect of such an adjustment of tap 68 is that under conditions when the video input wave 16 is below the cut-off level 48 of tube 24, both tubes 24 and 62 will conduct, and the output wave will be substantially identical to the input. When the input wave is between the cut-off level 48 of tube 24 and the cut-off level of tube 62, only the latter will be conductive. When the input wave is above the cut-off level of tube 62, neither tube will conduct. By a proper selection of values for the various circuit elements, the arrangement of Fig. 1 may, under the above conditions, operate to attenuate spurious high-frequency noise components to a certain predetermined degree in the dark gray region (when tube 24 alone is cut off), and to a greater predetermined degree in the near-black region (when both tubes 24 and 62 are cut off). The cut-off level for each tube, and hence the boundaries of the regions in which attenuation occurs, is controllable by varying the position of potentiometer taps 34 and 68 respectively.

Figure 4:
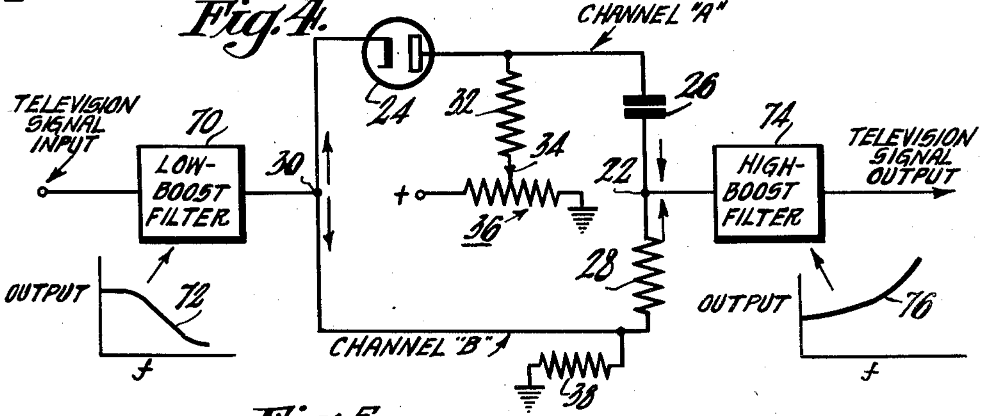
Figs. 4 and 5 are modifications of Fig. 1.

Fig. 4 shows a modification of the circuit of

Fig. 1 in which a low-boost filter 70 is employed between the television signal source and the input terminal 30. This unit boosts low frequencies as compared to high frequencies. The output vs. frequency characteristic of filter 70 is such as to accentuate the lower frequency components as indicated by the curve 72. A high-boost filter 74, having an output vs. frequency characteristic which may be as shown by the curve 76, is employed between terminal 22 and the television signal output of the system so that high frequency ranges are now accentuated and maintained prior to supplying the output signals to modulate either an image producing kinescope (not shown) or a suitable signal monitor device (also not shown). The low-boost filter 70 may be of any suitable type, such, for example, as a parallel resistance-condenser combination connected in the output circuit of an electron discharge device. An arrangement of this nature is disclosed in United States Patent No. 2,045,315 issued June 23, 1936 to J. P. Smith. The high-boost filter 74 may also be of any suitable type, such, for example, as a series resistance-inductance combination, the latter also being shown in United States Patent No. 2,045,315. However, it will be appreciated that these arrangements are being given merely as examples, and that other types of filter combinations may be used if desired.

As indicated by the characteristic curves 72 and 76, filters 70 and 74 are complementary in a product sense, so that when tube 24 is conducting with negligible resistance, the output of the circuit of Fig. 4 is substantially identical to the input. However, the low-boost filter 70 has the effect of reducing the relative amplitudes of the high-frequency components of the video input wave 16 which pass through channel A as compared to the low frequency components. Accordingly, for an input signal averaging black or near black, high-frequency noise, which in the absence of filter 70 might be strong enough to extend below the cut-off level 48 of tube 24 (Fig. 3) and thus escape the attenuating action of the system, is so reduced in amplitude as to remain above this cut-off level 48 and thus have no appreciable effect on the reproduced image.

Figure 5:
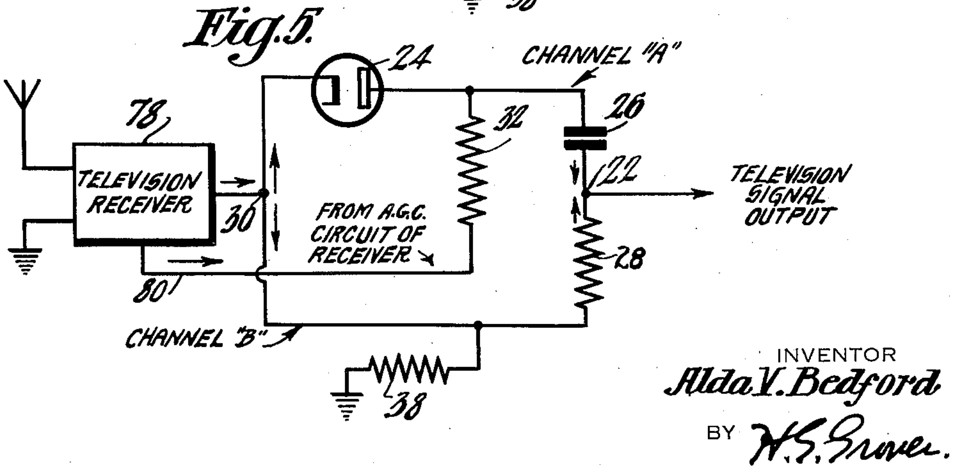

In Fig. 5 is shown a modification of Fig. 1 in which the terminal 30 is connected to receive the signal output of a television receiver, generally designated by the reference numeral 78. Receiver 78 may be of any type capable of providing the voltage variation 10, and is assumed to include automatic gain control, or AGC, as a part thereof in a manner known in the art.

That terminal of bias resistor 32, which in Fig. 1 is connected to the potentiometer tap 34, is connected in Fig. 5 to the AGC circuit of television receiver 78 by means of a lead 80. In this manner, the positive potential applied to the anode of tube 24 varies with variations in the AGC voltage developed by receiver 78. Since the bias for tube 24 is thus provided by receiver 78, it follows that reception of a strong R. F. signal by receiver 78 will develop a strong AGC voltage in the receiver and hence a more positive bias on tube 24. This acts to raise the cut-off level 48 (Fig. 3) of the tube 24 and results in a lesser degree of attenuation in the dark gray and black signal region of the input wave portion passing through channel A.

In the event that receiver 78 is provided with an AGC circuit in which the voltage becomes more negative with an increase in strength of the received signal, then this negative AGC voltage might be applied to the cathode of tube 24 rather than to the anode as shown in the drawing. Substantially the same result would be obtained. Or, if it is desired to retain the anode connection shown in Fig. 5, then a single stage D. C. amplifier might be inserted in the lead 80 to reverse the polarity of the negative AGC voltage obtained from receiver 78.

It should be noted that the tubes 24 and 62 of Figs. 1, 4 and 5 each has its cathode connected to the input terminal 30, and thus requires an input wave of the polarity of the input wave 10 in order to obtain the desired results. If the polarity of the input wave is opposite to that shown in Fig. 1, then the anodes and cathodes of tubes 24 and 62 should be reversed so that the anodes thereof are joined to the input terminal 30.

It should also be noted that in case the television receiver 78 of Fig. 5 is not provided with an AGC circuit, the lead 80 might be connected to a potentiometer ganged with the manual volume control. This would provide a bias for tube 24 which varies as a function of manually-controlled variations in the output level of the receiver.

While the circuits of Figs. 1, 4 and 5 have been described individually, it will be appreciated that various combinations of these circuits may be made without departing from the spirit of the invention.

Having thus described my invention, I claim:

1. Apparatus for reducing the effect of noise in the video signal circuit of a television system, which comprises means for dividing the composite video signal among three channels, means for limiting to approximately a predetermined value the peak amplitude of the said composite video signal in a first of said channels, means for limiting to approximately a different predetermined value the peak amplitude of the said composite video signal in a second of said channels, means for selecting from the peak amplitude-limited composite video signal in both said first and second channels the high-frequency components thereof, means for selecting from the composite video signal in the third of said channels low-frequency components thereof which are substantially complementary to the high-frequency components of said video signals selected from both said first and second channels, and means for combining the video signal components so selected.

2. Apparatus for reducing the effect of noise in the video signal circuit of a television system, which comprises means for dividing the composite video signal among three channels each containing the said composite video signal, means for peak limiting the amplitude of the said composite video signal in a first of said channels to substantially a predetermined value, means for peak limiting the amplitude of the said composite video signal in a second of the said channels to substantially a different predetermined value, and means for filtering the composite video signal in said three channels so as to obtain from said first and second channels high-frequency components of the said peak amplitude-limited composite video signal, and to obtain from the third of said channels low-frequency components of the said composite video signal which are substantially complementary to the said high-frequency components.

3. Apparatus according to claim 2, in which the limiting means in each of said first and second channels includes an electron discharge tube having at least an anode and a cathode, and means for applying a different value of positive potential to the anode of each of the electron discharge tubes.

4. Apparatus according to claim 2, in which the limiting means in each of said first and second channels includes an electron discharge tube, means for applying a bias potential to one electrode of each of said tubes, and means for adjusting the value of the said bias potential applied to each of said tubes.

5. In a television system arranged to respond to a composite series of video signals which may contain spurious high-frequency components, the combination of three parallel channels, two of said channels each containing a condenser and a peak-limiting device connected in series relation, the third of said channels including a resistor, and connections for supplying a composite video signal series to each of said three parallel channels and for deriving therefrom a modified composite video signal series.

6. A television system according to claim 5, in which the peak-limiting devices of said two channels limit the signals passed therethrough to different degrees.

7. In a television system to which a composite series of video signals is supplied and which signals may contain spurious high-frequency components, a low-boost filter connected to receive the video signal series at its input, means connected to receive the video signal output of said low-boost filter and to divide said output into two channels each containing the said video signal, means for limiting the amplitude of the said video signals in one of said channels, means for selecting from the amplitude-limited video signal in said one channel the high-frequency components thereof, means for selecting from the video signal in the other of said channels low-frequency components thereof which are substantially complementary to the high-frequency components of said video signal selected from said one channel, means for combining the video signal components so selected, a high-boost filter which is substantially complementary in a product sense to said low-boost filter, and means for applying the combined video signal components to said high-boost filter.

8. In a television system through which a composite series of video signals is arranged to be passed and which signals may contain spurious high-frequency components, a low-boost filter connected to receive the combined video signal series at its input, a first channel including a condenser and an amplitude-limiting device connected in series relation, a second channel, including a resistor, connected in parallel with said first channel, means for applying the output of said low-boost filter to both said channels, a high-boost filter having a characteristic which is substantially complementary in a product sense to said low-boost filter, and means for applying the output of both said channels to said high-boost filter.

9. A television system according to claim 8, in which said amplitude-limiting device is controllable to vary the limiting level.

10. In a television receiver system, including an automatic gain control circuit as a part thereof, the combination of means for dividing into two channels the video signal output of said receiver, means for amplitude-limiting the video signal in one of said two channels at a normally constant level, means for varying said amplitude-limiting level in accordance with changes in the output of said automatic gain control circuit of the receiver, means for selecting from the amplitude-limited video signal in said one channel the high-frequency components thereof, means for selecting from the video signal in the other of said channels low-frequency components thereof which are substantially complementary to the high-frequency components of said video signal selected from said one channel, and means for combining the video signal components so selected.

11. A television system in accordance with claim 10, in which said amplitude-limiting means comprises an electron discharge tube, and in which said means for varying said amplitude-limiting level includes means for varying the bias on said electron discharge tube.

12. In combination with a television receiver system having an automatic gain control circuit forming a part thereof, a first circuit comprising a condenser and an electron discharge device having at least two electrodes of which one is connected to one plate of said condenser, a second circuit comprising a resistor element having one terminal connected to the other electrode of said electron discharge device and the other terminal connected to the remaining plate of said condenser, a connection for applying the output of said receiver to the said two circuits at a point where the said resistor and the said tube electrode are connected, terminal means for connecting the electrode of said electron discharge device which is adjacent the condenser to the automatic gain control circuit of said receiver so as to control thereby the effective bias on said electrode and device, and an output terminal connection at the junction of the said resistor and condenser.

13. In a circuit for a composite video signal which varies between a black level and a white level, said levels having opposite polarity relative to a neutral point in said circuit, the method for reducing noise effects which comprises dividing said signal among three channels, two of which taken together are substantially complementary to the third channel in passing high-frequency and low-frequency components respectively, peak limiting to a predetermined value the signal components of black-level polarity in one of said high-frequency channels, peak limiting to another predetermined value the signal components of black-level polarity in the other high-frequency channel, and combining the components of said three channels.

14. In a television circuit adapted to receive a composite video signal, the combination of a first condenser and peak-limiting device connected in series relation to form a first signal path, a second condenser and peak-limiting device connected in series relation to form a second signal path in parallel with said first path, a resistor connected in parallel with both said paths and forming a third signal path, and connections for applying the video signal to all said paths and to combine into a new composite signal the output signals from all said paths.

15. In a television system connected to receive a composite series of video signals, a first serially connected combination of a condenser and an electron discharge device having at least an anode and a cathode, a second serially connected combination of a condenser and an electron discharge device having at least an anode and a cathode, separate connections from said anodes to the respective condensers, a resistor, a connection from one terminal of said resistor to both said cathodes, a connection from the other terminal of said resistor to the remaining plates of both said condensers, connections for applying individual operating potentials to the respective anodes, and a further connection for applying video signals to the common connection of said resistor and said cathodes.

ALDA V. BEDFORD.

REFERENCES CITED

The following references are of record in the file of this patent:

UNITED STATES PATENTS

| Number | Name | Date |
|---|---|---|
| 2,171,671 | Percival | Sept. 5, 1939 |
| 2,269,011 | Dallos | Jan. 6, 1942 |